US006408436B1

(12) United States Patent
de Haas

(10) Patent No.: US 6,408,436 B1
(45) Date of Patent: Jun. 18, 2002

(54) METHOD AND APPARATUS FOR CROSS-CONNECTION OF VIDEO SIGNALS

(75) Inventor: Scott de Haas, Santa Rosa, CA (US)

(73) Assignee: Next Level Communications, Rohnert Park, CA (US)

( * ) Notice: Subject to any disclaimer, the term of this patent is extended or adjusted under 35 U.S.C. 154(b) by 0 days.

(21) Appl. No.: 09/272,067

(22) Filed: Mar. 18, 1999

(51) Int. Cl.[7] .......................... H04N 7/173; H04L 12/28
(52) U.S. Cl. ...................... 725/86; 725/119; 725/120; 370/397
(58) Field of Search ................................ 725/78, 81–86, 725/91, 97, 114, 117, 119–120, 138, 144; 370/397–404

(56) References Cited

U.S. PATENT DOCUMENTS

| | | |
|---|---|---|
| 4,866,770 A | 9/1989 | Seth-Smith et al. |
| 4,994,909 A | 2/1991 | Graves et al. |
| 5,181,106 A * | 1/1993 | Sutherland |
| 5,457,560 A | 10/1995 | Sharpe et al. |
| 5,495,291 A | 2/1996 | Adams |
| 5,544,161 A * | 8/1996 | Bigham et al. |
| 5,555,243 A * | 9/1996 | Kahuma et al. |
| 5,555,244 A * | 9/1996 | Gupta et al. |
| 5,574,964 A | 11/1996 | Hamlin |
| 5,603,058 A | 2/1997 | Belknap et al. |
| 5,623,308 A | 4/1997 | Civanlar et al. |
| 5,668,948 A | 9/1997 | Belknap et al. |
| 5,684,799 A * | 11/1997 | Bigham et al. |
| 5,708,961 A * | 1/1998 | Hylton et al. |
| 5,712,976 A | 1/1998 | Falcon, Jr. et al. |
| 5,761,417 A | 6/1998 | Henley et al. |
| 5,774,206 A | 6/1998 | Wasserman et al. |
| 5,790,795 A | 8/1998 | Hough |
| 5,805,821 A | 9/1998 | Saxena et al. |
| 5,812,791 A | 9/1998 | Wasserman et al. |
| 5,842,111 A * | 11/1998 | Byers |
| 5,936,660 A * | 8/1999 | Gurantz |
| 6,100,883 A * | 8/2000 | Hoarty |

FOREIGN PATENT DOCUMENTS

| | | | | |
|---|---|---|---|---|
| WO | 97-01244 | * | 1/1997 | ............ H04N/7/10 |
| WO | WO 97/16925 | | 5/1997 | |
| WO | 98/37648 | | 8/1998 | |

OTHER PUBLICATIONS

Bellcore Communications Research, Active Network Interface Device (Residential Gateway), Generic Requirements, GR–2890–CORE, Issue 2, pp. 3–4, 7, 15–26 (Nov. 1996).
The RG Group, The Residential Gateway, info.gte.com/gte1/sponsored/rg/, pp. 10, 16–21 (Oct. 1995).
U.S. application No. 09/026,036, Eames et al., filed Feb. 19, 1998.

* cited by examiner

Primary Examiner—Andrew Faile
Assistant Examiner—Hai V. Tran
(74) Attorney, Agent, or Firm—Morrison & Foerster LLP

(57) ABSTRACT

A switched telecommunication access system for providing video data to gateway devices. The switched telecommunication access system includes a switched multicasting station for transmitting video data in response to receiving a video data request signal; and a plurality of gateway devices coupled to the switched multicasting station, the gateway devices sending video data request signals to the switched multicasting station and receiving video data from the switched multicasting station, at least one gateway device of the plurality of gateway devices including a controller for sending a video data request signal to the switched multicasting station and for routing video data received from the switched multicasting station in response to the video data request signal; and a plurality of video decoders coupled to the controller for decoding the video data received from the switched multicasting station; where one stream of video data representing a video program on a particular channel is sent from the switched multicasting station to one gateway device of the plurality of gateway devices even when the video program on the particular channel is requested for display on more than one display device coupled to the one gateway device.

90 Claims, 4 Drawing Sheets

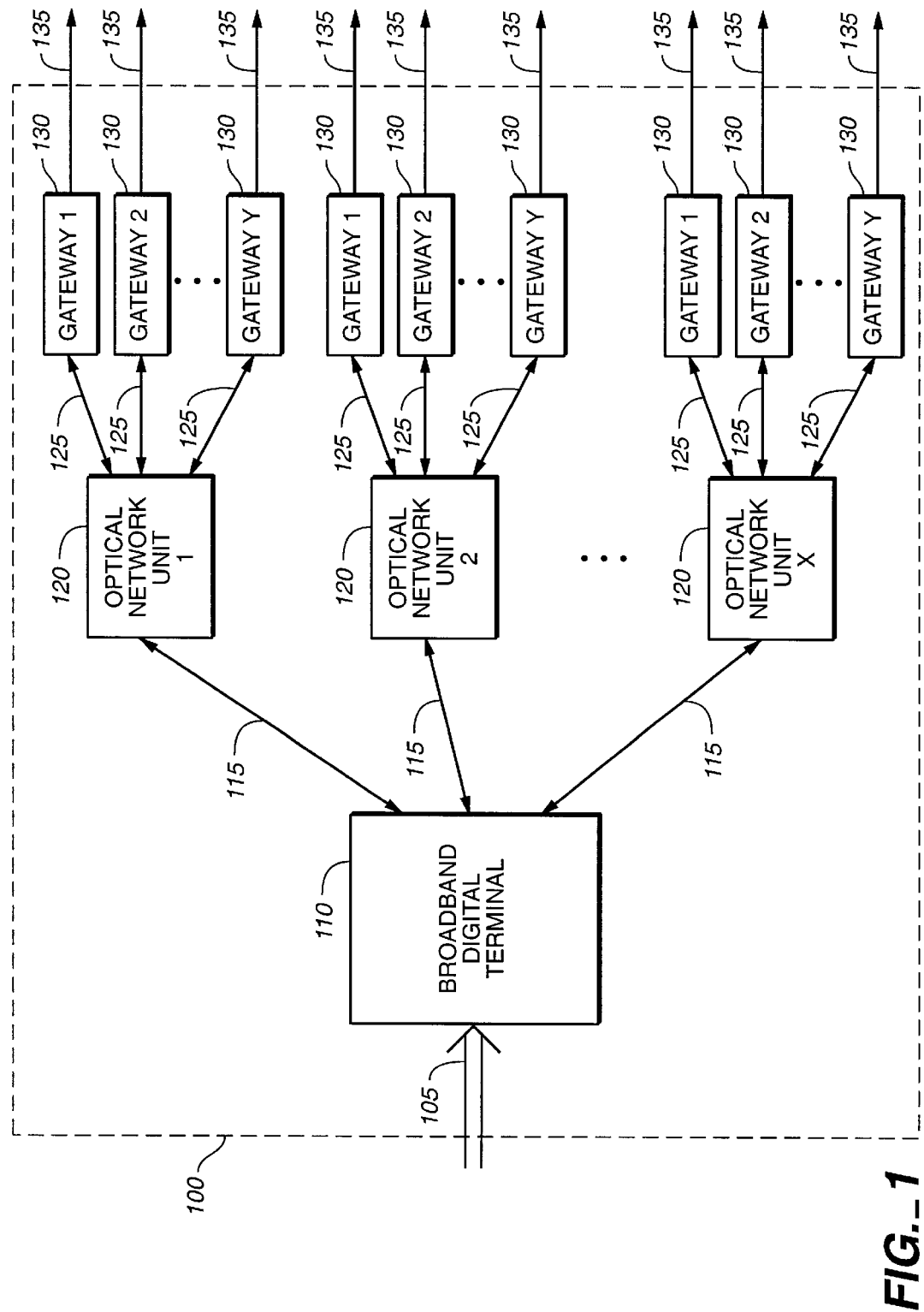
FIG._1

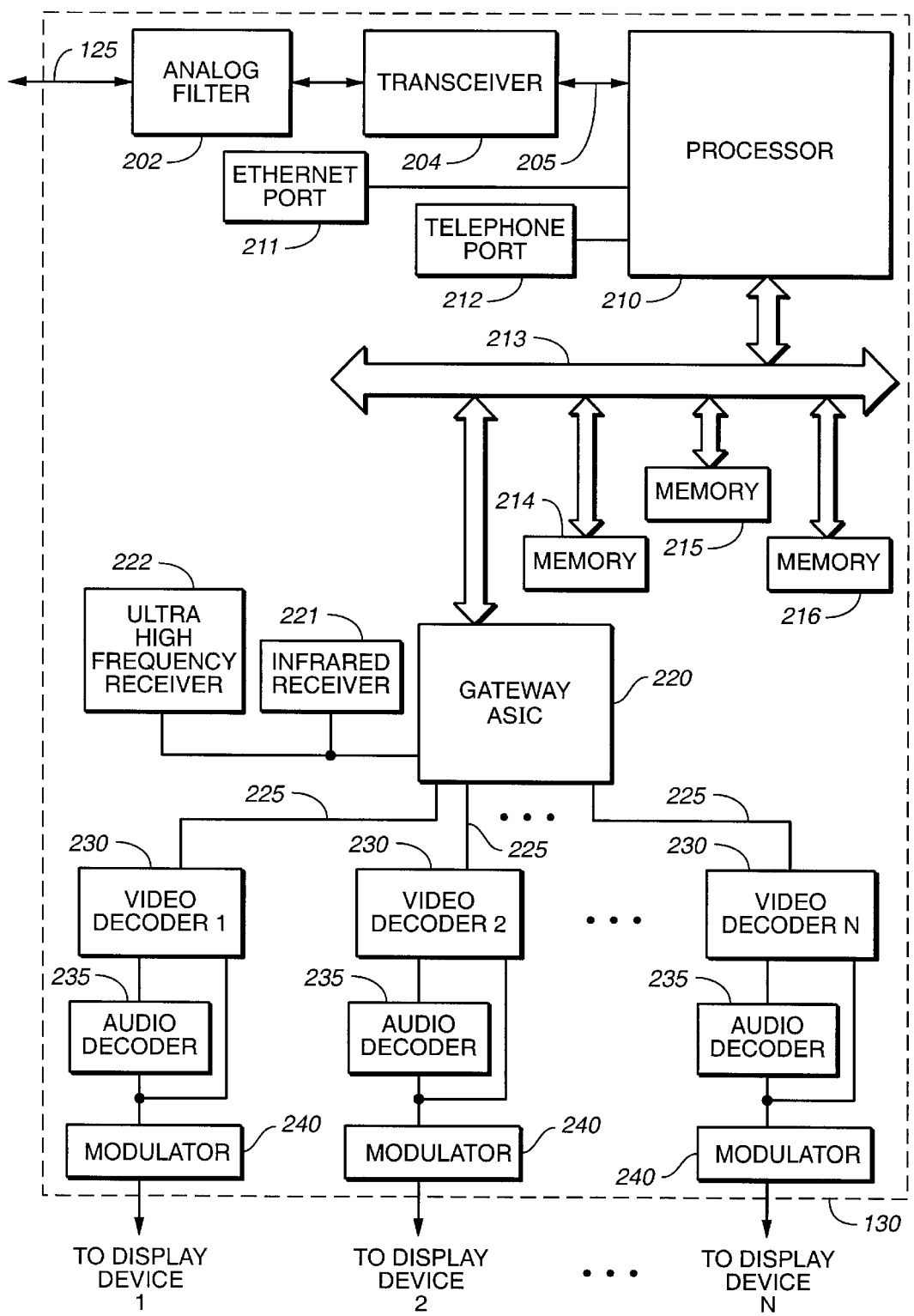
FIG._2

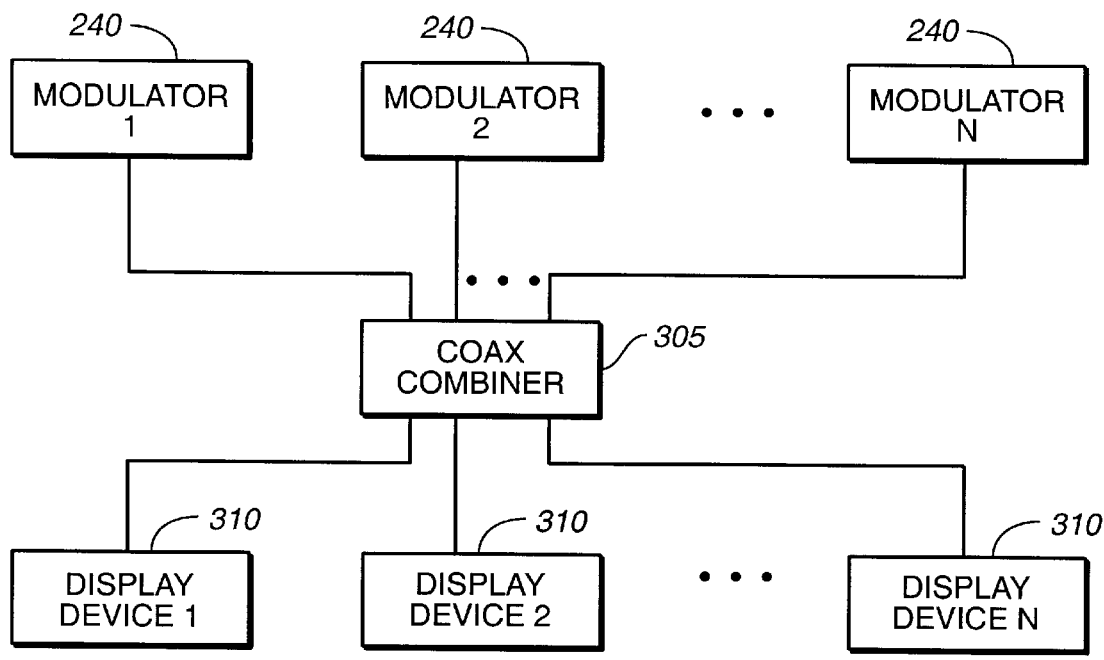
FIG._3
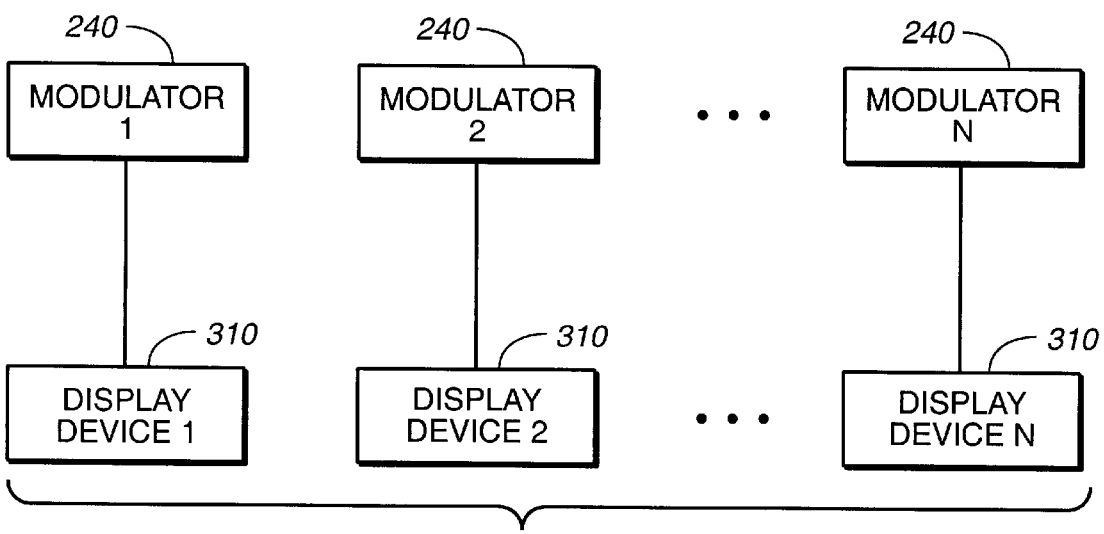
FIG._4

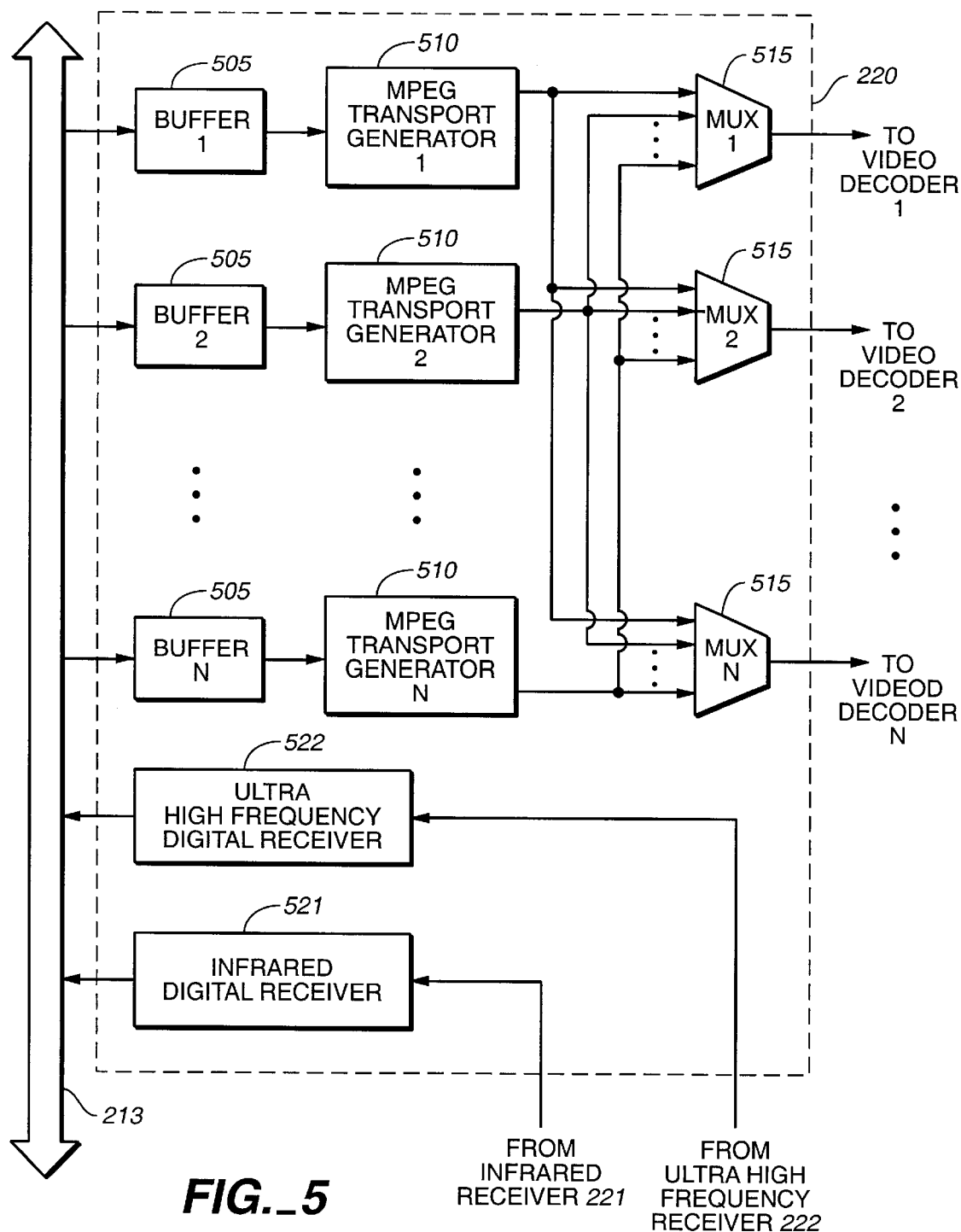
FIG._5

METHOD AND APPARATUS FOR CROSS-CONNECTION OF VIDEO SIGNALS

BACKGROUND OF THE INVENTION

1. Field of the Invention

This invention relates generally to telecommunication access systems and, in particular, to switched video telecommunication access systems.

2. Description of the Related Art

In many existing telecommunication access systems, such as cable systems and satellite systems, video programming on a predefined number of channels is broadcast to all subscribers units in the system. In other words, each subscriber unit receives the video programming of all the channels in the system. For each subscriber unit, the number of video programs that may be displayed at any point in time is limited by the total number of display devices (in addition to the number of display devices having the picture-in-picture feature) within the subscriber unit that are connected to the system. More specifically, for each subscriber unit, the number of video programs displayed at any point in time is limited by the number of display devices activated for displaying video programming. As the number of display devices within a subscriber unit, and more specifically the number of activated display devices within a subscriber unit, is generally much smaller than the number of channels in the system, video programs on a number of channels are not displayed at any given time. The broadcasting of undisplayed video programs occupies valuable bandwidth which is wasted.

Another disadvantage of broadcasting programs to all subscribers is that of potential unauthorized viewing of pay-per-view or premium channel programs. This problem is largely overcome by sending programs on pay-per-view and premium channels in scrambled mode and providing only authorized subscribers with means for unscrambling the programs. However, the problem is far from entirely eliminated as these programs may be descrambled by using unauthorized descrambling devices.

One prior art method of reducing theft is to use a switched rather than a broadcast system to transmit video programs to the subscriber units. In a switched system, video programs are sent to a subscriber unit in response to a request received from the subscriber unit. Although prior art switched systems generally provide greater protection against unauthorized viewing of programs, they do not address other issues that are recognized and addressed by the present invention.

SUMMARY OF THE INVENTION

One of the issues recognized and addressed by the present invention is the minimization of bandwidth used when transmitting a video program on a particular channel to multiple display devices associated with one gateway device. Thus, when a video program on a particular channel is requested for display on more than one display device associated with one gateway device, only one stream of video data representing the video program on the particular channel is transmitted to the one gateway device. Sending only one stream of video data representing a video program on a particular channel, rather than sending multiple streams of video data representing the video program on the same channel, reduces the amount of bandwidth used for transmitting to a gateway device a video program on a particular channel requested for display on multiple display devices associated with the gateway device. The gateway device distributes the video program to one or more display units within the gateway device on which the video program on the particular channel is requested to be displayed.

Similarly, only one stream of video data representing video programming on a particular channel is sent from the broadband digital terminal (BDT) to an optical network unit (ONU) even when more than one gateway device associated with a particular ONU request the video data on the particular channel. Therefore, only one stream of video data representing video programming on a particular channel is transmitted from the BDT to any one ONU. The ONU then sends the video data to each gateway device associated with the ONU which requests the video program on the particular channel. For each gateway device requesting the video program on the particular channel, the ONU sends only one stream of video data representing the video programming on the particular channel. Sending of one rather than multiple streams of video data representing the video programming on the particular channel saves considerable bandwidth that would otherwise be wasted on sending multiple copies of the video program on the particular channel from the BDT to the one or more ONUs and from the one or more ONUs to the one or more gateway devices.

In a presently preferred embodiment of the present invention, the stream of video data is transmitted to the gateway device in ATM cells. Video data representing the video programming on a particular channel is identified with only one Virtual Path Identifier (VPI) and one Virtual Channel Identifier (VCI) throughout the system. Therefore, only one VPI and one VCI is used to identify the video data representing the video programming on a particular channel as the video data is transmitted from the BDT to any ONU in the system. Similarly, the same VPI and VCI is used to identify the video data representing the video programming on the particular channel as the video data is transmitted between any ONU and any gateway device associated with the ONU. This allows sending only one stream of video data representing the video programming on a particular channel from the BDT to any one ONU and from any one ONU to any one gateway device associated with the ONU. Use of only one VPI and one VCI, rather than a multiple number of VPIs and VCIs, reduces the amount of bandwidth used for transmitting video data from the BDT to the ONUs and from the ONUs to the gateway devices. The ONU multicasts the video program to all the gateway devices associated with the ONU requesting the video program. Similarly, the gateway device multicasts the video program to all the display devices associated with the gateway device on which the video program on the particular channel is to be displayed.

In a presently preferred embodiment of the invention, the switched telecommunication access system comprises: a switched multicasting station for transmitting video data in response to receiving a video data request signal; and a plurality of gateway devices coupled to the switched multicasting station, the gateway devices sending video data request signals to the switched multicasting station and receiving video data from the switched multicasting station, at least one gateway device of the plurality of gateway devices comprising: a controller for sending a video data request signal to the switched multicasting station and for routing video data received from the switched multicasting station in response to the video data request signal; and a plurality of video decoders coupled to the controller for decoding the video data received from the switched multicasting station; wherein one stream of video data representing a video program on a particular channel is sent from the switched multicasting station to one gateway device of the plurality of gateway devices even when the video program on the particular channel is requested for display on more than one display device coupled to the one gateway device.

In another presently preferred embodiment of the invention, the switched telecommunication access system comprises: a switched multicasting station for transmitting video data in response to receiving a video data request signal; and a plurality of gateway devices coupled to the switched multicasting station, the gateway devices sending video data request signals to the switched multicasting station and receiving video data from the switched multicasting station, at least one gateway device of the plurality of gateway devices comprising: a plurality of video decoders for decoding video data received from the switched multicasting station; and a controller for sending a video data request signal to the switched multicasting station and for routing video data received from the switched multicasting station in response to the video data request signal, the controller comprising: a plurality of selectors, each selector of the plurality of selectors receives a plurality of video data streams and in response to a control signal from the controller selects one video data stream of the plurality of video data streams for transmission to one of the plurality of video decoders.

The present invention is explained in more detail below with reference to the drawings.

BRIEF DESCRIPTION OF THE DRAWINGS

FIG. 1 is a block diagram of a presently preferred embodiment of a switched video telecommunication access system (SVTAS) of the invention.

FIG. 2 is a detailed block diagram of the presently preferred embodiment of the gateway device of the invention.

FIG. 3 is a block diagram of display devices coupled to the modulators of the gateway device in one embodiment of the present invention.

FIG. 4 is a block diagram of display devices coupled to the modulators of the gateway device in another embodiment of the present invention.

FIG. 5 is a block diagram of a presently preferred embodiment of the gateway ASIC of the present invention showing the digital receivers in the gateway ASIC and the devices in the gateway ASIC used for routing video data in the gateway ASIC.

DETAILED DESCRIPTION OF THE PREFERRED EMBODIMENT

The present invention comprises a novel switched video telecommunication access system and related methods for cross-connection of video signals transmitted by the access system. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Channel is herein used to refer to an equivalent of a television, cable, or a satellite channel. As such, channel herein is intended to have its commonly understood meaning and is not to be confused with an Asynchronous Transfer Mode (ATM) or other type of channel.

As used herein video data is intended to cover both audio and video data. More generally, video data is intended to encompass wide bandwidth signals generally, of which video signals are typical.

FIG. 1 is a block diagram of a presently preferred embodiment of a switched video telecommunication access system (SVTAS) of the invention. In a presently preferred embodiment of the invention, the SVTAS 100 comprises a broadband digital terminal (BDT) 110, X optical network units (ONUs) 120, and X times Y gateway devices 130, where X and Y are integers. In presently preferred embodiments, ONUs 120 may comprise universal service access multiplexers (USAMs) or broadband network units (BNUs). In a presently preferred embodiment, BDT 110 comprises a BDT available from Next Level Communications of Rohnert Park, Calif., as part number 750-00008. Also, in a presently preferred embodiment, ONUs 120 comprise BNUs or USAMs available from Next Level Communications of Rohnert Park, Calif., as part numbers 750-00150 and 750-00086, respectively. In a preferred embodiment, X and Y are 64 and 32, respectively. The BDT 110 receives video signal on input lines 105, which in a presently preferred embodiment comprise optical carrier level 12 (OC-12) lines. The BDT 110 is coupled to the X ONUs 120 by lines 115, which in a presently preferred embodiment comprise optical carrier level (OC-3) lines. Each ONU 120 is coupled to Y gateway devices 130 by lines 125, which in the presently preferred embodiment comprise twisted pair very high speed digital subscriber lines (VDSLs). Each gateway device 130 is in turn coupled to one or more display devices (shown in FIGS. 3 and 4), such as televisions, via line 135.

In the presently preferred embodiment of the invention, when one or more gateway devices 130 request the video program on a particular channel of the SVTAS system 100, then the BDT 110 sends the video data to the ONU or ONUs 120 associated with that one or more gateway devices 130 requesting the video program on the particular channel. Thereafter, the ONU 120 multicasts the requested video program to the one or more gateway devices 130 requesting the video program. Each gateway device 130 receiving the video program in turn sends the video program to the one or more display devices associated with the gateway device on which the video program is requested for display.

On each line 115, only one stream of video data representing the video program on a particular channel, without duplication other than to the extent necessary for error checking and correcting, is transmitted from the BDT 110 to the ONU or ONUs 120 whose associated gateway device or devices request the video program on the particular channel independent of the number of gateway devices requesting the video program. The BDT 110 registers in its multicasting map or table all the ONUs 120 to which the video data representing the video programming on a particular channel is transmitted. Similarly, on each line 125, only one stream of video data representing the video program on a particular channel, without duplication other than to the extent necessary for error checking and correcting, is transmitted from the ONU 120 to the gateway device or devices 130 associated with the ONU 120 which request the video program independent of the number of display devices on which the video program is to be displayed. Each ONU 120 registers in its multicasting map or table all the gateway devices 130 to which the video data representing the video programming on a particular channel is transmitted.

The sending of only one stream of video data representing the video program on a particular channel saves considerable bandwidth that would otherwise be wasted in sending multiple stream of video data representing multiple copies of the video program on the same channel. This saving of bandwidth occurs both on lines 115 between the BDT 110 and ONUs 120 and on lines 125 between the ONUs 120 and the gateway devices 130. Similarly, this saving is repeated for each channel in the SVTAS 100. In other words, for each channel in the SVTAS 100, no more than one stream of video data representing the video program on the channel is transmitted on any one line 115 or on any one line 125.

In a presently preferred embodiment of the invention, video data on lines 115 and 125 is transmitted in ATM. Furthermore, the video data representing the video program on a particular channel is identified with only one VPI and one VCI throughout the SVTAS 100. Thus, the same VPI and VCI identify the video data representing the video program on a particular channel in the BDT 110, on all the lines 115, in all the ONUs 120, on all the lines 125, and in all the gateway devices 130 of the SVTAS 100. The video data representing the video program on each channel thus has its own VPI and VCI that is the same throughout the SVTAS 100.

FIG. 2 is a detailed block diagram of the presently preferred embodiment of the gateway device of the invention, which may be a residential gateway device. The gateway device 130 is coupled to ONU 120 (shown in FIG. 1) by line 125. Analog filter 202, which in a presently preferred embodiment comprises a VDSL filter, receives analog signals transmitted by ONU 120 on line 125. Thereafter, the analog filter 202 conditions the analog signals, including amplifying the analog signals, and sends them to transceiver 204. In a presently preferred embodiment, transceiver 204 comprises a BCM6010 chip, which is a transceiver available from Broadcom Corporation of Irvine, Calif. In a presently preferred embodiment, the transceiver 204 includes an analog to digital (A/D) converter, a digital to analog (D/A) converter, a modulator, a demodulator, and ATM Utopia Levels 1 and 2 standard interfaces. The transceiver 204 extracts digital information from the analog signals received from analog filter 202. Thereafter, the transceiver 204 transmits the digital information to processor 210 via line 205, which in a presently preferred embodiment comprises a standard Utopia bus. In a presently preferred embodiment, the processor 210 comprises a MOTOROLA 860 Segmentation and Reassembly (SAR) Power PC, which is available from Motorola, Inc. The processor 210, among other things, converts the digital information received from transceiver 204 into ATM protocol data units (PDUs). The processor 210 is coupled to an Ethernet port 211 and a telephone port 212. In a presently preferred embodiment, Ethernet port 211 and telephone port 212 comprise RJ 45 and RJ 11 ports, respectively. The Ethernet port 211 allows connecting a computer (not shown), such as a personal computer, to the internet by way of the line 125, ONU 120, line 115, BDT 110, and a link between BDT 110 and the internet. Telephone port 212 allows connecting a telephone line to the gateway device 130 for purposes, of among other things, displaying, on at least one display device coupled to the gateway device, the telephone number of the telephone line from which an incoming call is made to the telephone line connected to the telephone port 212. The processor 210 is also coupled to the processor bus 213, which in a presently preferred embodiment is a MOTOROLA 860SAR Power PC bus.

Memory 214, memory 215, and memory 216, which comprise dynamic random access memory (DRAM), DRAM expansion, and flash memories, respectively, are also coupled to the processor bus 213. Also coupled to the processor bus 213 is a gateway application specific integrated circuit (gateway ASIC) 220.

The gateway ASIC 220 is also coupled to an infrared (IR) receiver 221 and an ultra high frequency (UHF) receiver 222. A user inputs commands to the IR remote control (not shown) or the UHF remote control (not shown) which transmit the desired commands to the IR receiver 221 or the UHF receiver 222, respectively. IR receiver 221 and UHF receiver 222 receive analog signals from the IR remote control and the UHF remote control, respectively. IR receiver 221 and UHF receiver 222 convert their respectively received analog signals into digital signals and transmit the digital signals to the gateway ASIC 220, more specifically to the IR digital receiver 521 (shown in FIG. 5) and the UHF digital receiver 522 (shown in FIG. 5) in gateway ASIC 220, respectively, which forward the digital signals to the processor 210 via processor bus 213. As is well known to those skilled in the art, the user may also input requests using a user interface (not shown) of the gateway device 130 other than the remote control devices either in conjunction with or in place of the remote control devices. One of the commands that may be input by a user is a request to display on a particular display device in the subscriber unit video programming on a particular channel of the SVTAS 100. Such a command is transmitted from the gateway ASIC 220 to the processor 210. The processor 210, then transmits the request to the BDT 110. In response to the request, the BDT 110 transmits to the gateway device 130 the video programming on the requested channel in ATM using only one VPI and one VCI to identify the video programming on the requested channel. If the video programming on the requested channel is requested to be displayed on additional display device or devices within the subscriber unit, the BDT 110 does not use another VPI and VCI for transmitting the requested programming to the additional device or devices. As mentioned above, in the presently preferred embodiment of the SVTAS 100 of the present invention, only one VPI and one VCI is used for transmitting the video programming on a particular channel to the gateway device 130 of a subscriber unit in order to save bandwidth that would otherwise be wasted in using more than one VPI or VCI for transmitting video programming on a particular channel to more than one display device within a subscriber unit.

The gateway ASIC 220, among other things, converts the ATM PDUs received from the processor 210 into a suitable video format for decoding by video decoders 230, which are preferably digital video decoders. In a presently preferred embodiment, gateway ASIC 220 converts the ATM PDUs received from processor 210 into MPEG data as video decoders 230 comprise MPEG decoders. More specifically, in a presently preferred embodiment, video decoders 230 comprise SGS5500 MPEG decoders, which are available from ST Microelectronics, also known as SGS Thompson. In FIG. 2, gateway ASIC 220 is shown as being coupled to N video decoders 230. N is an integer greater than or equal to one, represents the maximum number of display devices that may be coupled to the gateway device 200, and in a presently preferred embodiment is equal to 4. In a presently preferred embodiment of the invention, the bus 225 coupling the gateway ASIC 220 to each of the video decoders 230 comprises an MPEG transport and an oversampled (OS) link. The MPEG transport includes data, packet clock and bit clock lines. The OS link is a control data bus that includes data in and data out lines. The OS link provides a communication path between the processor 210 and the video decoders 230 by way of the gateway ASIC 220. The processor 210 controls the operation of the video decoders 230 by providing each video decoder 230 with control signals via the OS link indicating, for example, when the video decoder should start decoding, stop decoding, and what video data to output. Each video decoder is in turn coupled to an audio decoder 235, which is preferably a digital audio decoder. In a presently preferred embodiment, audio decoder 235 comprises an SGS4600 audio decoder, which is a Dolby AC3 audio decoder also available from ST Microelectronics. Each video decoder 230 and audio decoder 235 is coupled to a modulator 240. Each modulator 240 receives signals from the video decoder 230 and audio decoder 235 to which it is coupled. Thereafter, each modulator 240 modulates the received signals onto carriers to produce broadcast type signals compatible with standard televisions and transmits the modulated signals to a display device (shown in FIGS. 3 and 4), such as a television. In a preferred embodiment, modulators 240 comprise RF modulators, such as TDA6060, an RF modulator, available from Siemens AG. In one embodiment of the invention, at least one video decoder 230 provides both Separate Video (S Video) and Composite Video outputs to a display device to which it is connected. As is known to those skilled in the art, the S Video and Composite Video outputs are sent to the display device without being modulated.

In one embodiment of the invention, such as that shown in FIG. 3, the modulators 240 are coupled to a coaxial combiner 305. Coaxial combiner 305 is in turn coupled to display devices 310 and routes the outputs of modulators 240 to the appropriate display devices. In a second embodiment, such as that shown in FIG. 4, there is no coaxial combiner between the modulators 240 and the display devices 310. In the second embodiment, each modulator is coupled to one display device and sends its output to that one display device.

FIG. 5 is a block diagram of a presently preferred embodiment of the gateway ASIC 220 of the present invention showing the digital receivers in the gateway ASIC and the devices in the gateway ASIC used for routing video data in the gateway ASIC. Gateway ASIC 220 includes N buffers 505, N MPEG transport generators 510 and N multiplexers 515. In a presently preferred embodiment, buffers 505 are 32 bit wide random access memory (RAM) units having a storage capacity of about 10 ATM PDUs, more specifically each buffer 505 has a storage capacity of 1024 bits (1 kbit) by 32 bits. Additionally, buffers 505 are first-in-first-out (FIFO) buffers. Buffers 505 are coupled to the processor bus 213 and receive ATM PDUs therefrom. The processor 210 determines the first available buffer 505 and sends incoming data thereto. Each buffer 505 is coupled to one MPEG transport generator 510. Each buffer 505 sends data that it receives to the MPEG transport generator 510 to which it is coupled. For example, the first MPEG transport generator (i.e.,. MPEG transport generator 1) receives data from the first buffer (i.e., buffer 1) while the Nth MPEG transport generator (i.e., MPEG transport generator N) receives data from the Nth buffer (i.e., buffer N). Each MPEG transport generator 510 converts the ATM PDUs it receives from its corresponding buffer 505 into serial MPEG packets. As can be seen in FIG. 5, each MPEG transport generator 510 is coupled to all N of the multiplexers 515. Each multiplexer 515 is coupled to one video decoder (shown in FIG. 2). For example the first multiplexer is coupled to the first video decoder (shown in FIG. 2) whereas the Nth multiplexer is coupled to the Nth video decoder (shown in FIG. 2).

In a presently preferred embodiment, each of multiplexers 515 is an N×1 multiplexer, where N is as defined above. Under the control of processor 210, each multiplexer 515 selects one of its N inputs. For each multiplexer 515, the processor determines which of the N inputs to the multiplexer 515 corresponds to the video programming of the particular channel requested by the display device 310 coupled to the multiplexer 515 and selects that input for transmission to the display device 310. In a presently preferred embodiment of the invention, for each multiplexer 515, the processor 210 selects the input having the same VPI and VCI as that of the video program requested by the display device coupled to the particular multiplexer 515. For example, if the second display device 310 requests video programming on a particular channel and that video program on that particular channel happens to be sent to the Nth buffer 505, then for the second multiplexer 515, the processor 210 selects. the input from the Nth buffer 505 for transmission to the second display device 310. If the first display device 310 also requests the video programming on the particular channel requested by the second display device and as before the video programming on the particular channel continues to be sent to the Nth buffer 505, then for both the first and second multiplexers 515, the processor 210 selects the Nth input for transmission to the first and second display devices.

Gateway ASIC 220 also comprises IR digital receiver 521 and UHF digital receiver 522, which receive digital signals from the IR receiver 221 (shown in FIG. 2) and the UHF receiver 222 (shown in FIG. 2), respectively. The IR digital receiver 521 and UHF digital receiver 522. send digital signals to the processor 210 via bus 213.

In another embodiment of the present invention, gateway ASIC 220 does not include multiplexers 515. In such an embodiment, each display unit 310 receives data from only one buffer 505. Accordingly, the processor 210 sends requested data to the buffer/buffers 505 corresponding to the display device/devices 310 requesting the data. Thus, if the second display device 310 requests video programming on a particular channel, then under the direction of the processor 210, the requested video programming is sent to the second buffer 505, i.e., the buffer which is coupled to the second display device. If the first display device 310 also requests the video programming requested by the second display device 310, then the video programming is sent to the first buffer 505, i.e., the buffer coupled to the first display device 310, and to the second buffer 505, which as stated above is the buffer coupled to the second display device 310.

Summary of the operation of the SVTAS 100 of the present invention:

The video data transmission process begins with a request by a user to view the video program on a particular channel. In addition to specifying a particular channel whose video program a user wishes to view, the user also specifies the display device, within the subscriber unit, on which the user wishes to view the video program on the particular channel when there is more than one display device coupled to the gateway device of the subscriber unit. In a presently preferred embodiment, a request may be made using a remote control device, such as a UHF or an IR remote control device. Alternatively, some other user interface may be provided by the gateway device 130 for allowing a user to enter a request. The display device on which the video program is requested for display may also be identified by the remote control device or other user interface device used for making the request as each remote control device or other user interface device may be associated either on a permanent or temporary basis with only one of the display devices coupled to the gateway device. The request entered by the user is forwarded to the processor 210 in the gateway device. The processor then forwards the request to the BDT 110. In a presently preferred embodiment, the processor 210 transmits a request to the BDT 110 in ATM. In response to the request, the BDT 110 transmits the video program on the particular channel to the ONU 120 associated with the requesting gateway device. If the ONU 120 was already receiving the video program on the requested channel because some other gateway device associated with the ONU 120 had already requested the video program on the requested channel, then no additional stream of video data representing the video program on the requested channel would be transmitted to the ONU 120 in response to the new request for the same channel. Thus, the ONU 120 receives only one stream of video data representing the video program on the requested channel independent of the number of gateway devices coupled to the ONU 120 requesting the video program on the requested channel. Similarly, the ONU 120 sends one stream of video data representing the video program on the requested channel to the gateway device independent of the number of display devices coupled to the requesting gateway device on which the video program is requested for display. In a presently preferred embodiment, the BDT 110 transmits data to the gateway device 130 in ATM. Additionally, the BDT 110 uses only one VPI and one VCI to identify the video program on the particular channel sent to one gateway device regardless of the number of display devices, within the subscriber unit coupled to the gateway device 130, on which the video program on the particular channel is to be displayed.

In the gateway device 130, analog filter 202, conditions the received analog signals, including amplifying the analog signals, and sends them to transceiver 204. The transceiver 204 extracts digital data from the analog signals received from analog filter 202. Thereafter, the transceiver 204 transmits the digital data to the processor 210. The processor 210 converts the digital data received from the transceiver 204 into ATM PDUs and sends the ATM PDUs to the gateway ASIC 220.

In an embodiment of gateway ASIC 220 having multiplexers 515, the processor 210 sends the ATM PDUs to the first available buffer 505 (which may be a buffer 505 other than the first buffer, i.e., buffer 1, but which for purposes of illustration will herein be referred to as the first buffer 505) among buffers 505. Thereafter, the first buffer 505 transmits the ATM PDUs to the MPEG transport generator 510 coupled to the first buffer 505. The MPEG transport generator 510 converts the ATM PDUs into serial MPEG packets and sends the serial MPEG packets to all the multiplexers 515 in gateway ASIC 220. Under the control of processor 210, only the multiplexers 515 which are coupled to the display devices on which the video program from the first buffer 505 is to be displayed select the data of the first buffer 505 for further transmission. The other multiplexers 515 either select data of a buffer 505 other than the first buffer 505 or no data at all for further transmission depending on what is requested by the display device to which they are coupled.

In an embodiment of the gateway ASIC 220 having no multiplexers, such as multiplexers 515, the processor 210 sends the ATM PDUs only to the buffers 505 which are coupled to the display devices on which the video program contained in the ATM PDUs have been requested for display. In other words, the processor does not simply send the ATM PDUs to the first available buffer 515. Thereafter the buffer or buffers 505 receiving the ATM PDUs send them to the MPEG transport generator or generators 510 to which it or they are coupled. Each MPEG transport generator 510 receiving ATM PDUs converts the ATM PDUs into serial MPEG packets and sends the serial MPEG packets to the video decoder 230 to which it is coupled.

Each video decoder 230 decodes the serial MPEG packets that it receives and sends the decoded video data to the modulator 240 to which it is coupled. Similarly, each audio decoder 235 decodes audio data that it receives and sends the decoded audio data to the modulator 240 to which it is coupled. Each modulator 240 modulates the video and audio data that it receives and sends the modulated data to its corresponding display device 310. In one embodiment of the invention, at least one video decoder 230 provides an S Video or Composite Video output to the display device, thus bypassing modulators 240.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. A switched telecommunication access system comprising:

a switched multicasting station for transmitting video data in response to receiving a video data request signal; and a plurality of gateway devices coupled to the switched multicasting station, said gateway devices sending video data request signals to said switched multicasting station and receiving video data from said switched multicasting station, at least one gateway device of said plurality of gateway devices comprising:

a controller for sending a video data request signal to said switched multicasting station and for routing video data received from said switched multicasting station in response to the video data request signal; and a plurality of video decoders coupled to said controller for decoding the video data received from said switched multicasting station;

wherein one stream of video data representing a video program on a particular channel is sent from said switched multicasting station to one gateway device of said plurality of gateway devices even when the video program on the particular channel is requested for display on more than one display device coupled to said one gateway device, further wherein the one stream of video data representing the video program on the particular channel is used to display the video program on the more than one display device coupled to said one gateway device requesting the video program, the more than one display device requesting the video program, further wherein for the particular channel, the one stream of video data includes one copy, rather than multiple copies, of the video program on the particular channel.

2. The switched telecommunication access system of claim 1, wherein said switched multicasting station transmits video data to said gateway devices in Asynchronous Transfer Mode (ATM), further wherein only one Virtual Path Identifier (VPI) and one Virtual Channel Identifier (VCI) is used to identify video data on a particular channel sent from said switched multicasting station to one gateway device of said plurality of gateway devices even when the video data on the particular channel is requested for display on more than one display device coupled to said one gateway device.

3. The switched telecommunication access system of claim 2, wherein said controller comprises a gateway application specific integrated circuit (gateway ASIC), said gateway ASIC comprising a plurality of buffers.

4. The switched telecommunication access system of claim 3, wherein said controller further comprises a processor coupled to said gateway ASIC.

5. The switched telecommunications access system of claim 4, wherein said gateway ASIC further comprises a plurality of selectors, each selector of said plurality of selectors is coupled to each buffer of said plurality of buffers, each selector of said plurality of selectors is coupled to one corresponding video decoder of said plurality of video decoders and in response to a control signal from said processor selects data received from one of said plurality of buffers for transmission to said one corresponding video decoder.

6. The switched telecommunication access system of claim 5, wherein said plurality of video decoders comprises a plurality of Moving Pictures Experts Group (MPEG) decoders.

7. The switched telecommunication access system of claim 6, wherein said plurality of selectors comprises a plurality of multiplexers, said gateway ASIC further comprises a plurality of MPEG transport generators, each MPEG transport generator of said plurality of MPEG transport generators is coupled to one corresponding buffer of said plurality of buffers and receives data from said one corresponding buffer, each MPEG transport generator is coupled to each multiplexer of said plurality of multiplexers, each multiplexer of said plurality of multiplexers in response to a control signal from said processor selects data received from one MPEG transport generator of said plurality of MPEG transport generators for transmission to one corresponding MPEG decoder of said plurality of MPEG decoders.

8. The switched telecommunication access system of claim 7, wherein said switched multicasting station comprises a broadband digital terminal.

9. The switched telecommunication access system of claim 8 further comprising a plurality of optical network units coupled to said broadband digital terminal and said plurality of gateway devices.

10. A switched telecommunication access system comprising:
a switched multicasting station for transmitting video data in response to receiving a video data request signal; and
a plurality of gateway devices coupled to the switched multicasting station, said gateway devices sending video data request signals to said switched multicasting station and receiving video data from said switched multicasting station, at least one gateway device of said plurality of gateway devices comprising:
a plurality of video decoders for decoding video data received from said switched multicasting station; and
a controller for sending a video data request signal to said switched multicasting station and for routing video data received from said switched multicasting station in response to the video data request signal, said controller comprising:
a plurality of selectors, each selector of said plurality of selectors receives a plurality of video data streams and in response to a control signal from said controller selects one video data stream of the plurality of video data streams for transmission to one of said plurality of video decoders, wherein each of said plurality of selectors is coupled to one corresponding video decoder of said plurality of video decoders; and
a plurality of buffers, each selector of said plurality of selectors is coupled to each buffer of said plurality of buffers for receiving the plurality of video data streams from said plurality of buffers, wherein each incoming video data stream is assigned to a first available buffer of said plurality of buffers such that video data in the incoming video data stream is stored in the first available buffer.

11. The switched telecommunication access system of claim 10, wherein said controller comprises a gateway application specific integrated circuit (gateway ASIC), said gateway ASIC comprising said plurality of selectors and said plurality of buffers.

12. The switched telecommunication access system of claim 11, wherein said controller further comprises a processor coupled to said gateway ASIC, each selector of said plurality of selectors is coupled to one corresponding video decoder of said plurality of video decoders and in response to a control signal from said processor selects a video data stream received from one of said plurality of buffers for transmission to said one corresponding video decoder.

13. The switched telecommunication access system of claim 12, wherein said plurality of video decoders comprises a plurality of Moving Pictures Experts Group (MPEG) decoders.

14. The switched telecommunication access system of claim 13, wherein said plurality of selectors comprises a plurality of multiplexers, said gateway ASIC further comprises a plurality of MPEG transport generators, each MPEG transport generator of said plurality of MPEG transport generators is coupled to one corresponding buffer of said plurality of buffers and receives a video data stream from said one corresponding buffer, each MPEG transport generator is coupled to each multiplexer of said plurality of multiplexers, each multiplexer of said plurality of multiplexers in response to a control signal from said processor selects a video data stream received from one MPEG transport generator of said plurality of MPEG transport generators for transmission to one corresponding MPEG decoder of said plurality of MPEG decoders.

15. The switched telecommunication access system of claim 14, wherein one stream of video data representing a video program on a particular channel is sent from said switched multicasting station to one gateway device of said plurality of gateway devices even when the video program on the particular channel is requested for display on more than one display device coupled to said one gateway device.

16. The switched telecommunication access system of claim 15, wherein said switched multicasting station transmits video data to said gateway devices in Asynchronous Transfer Mode (ATM), further wherein only one Virtual Path Identifier (VPI) and one Virtual Channel Identifier (VCI) is used to identify video data on a particular channel sent from said switched multicasting station to one gateway device of said plurality of gateway devices even when the video data on the particular channel is requested for display on more than one display device coupled to said one gateway device.

17. A switched telecommunication access system comprising:
a switched multicasting station for transmitting video data in response to receiving a video data request signal; and a plurality of gateway devices coupled to the switched multicasting station, said gateway devices sending video data request signals to said switched multicasting station and receiving video data from said switched multicasting station, at least one gateway device of said plurality of gateway devices comprising:
   a plurality of video decoders for decoding video data received from said switched multicasting station; and
   a controller for sending a video data request signal to said switched multicasting station and for routing video data received from said switched multicasting station in response to the video data request signal, said controller comprising:
      a plurality of buffers; and
      a plurality of transport generators, wherein each buffer of said plurality of buffers is coupled to one corresponding transport generator of said plurality of transport generators, and each said buffer receives video data representing a video program requested for display on a display device corresponding to said one corresponding transport generator, stores the video data, and sends the video data to said one corresponding transport generator, further wherein each transport generator of said plurality of transport generators is coupled to one corresponding video decoder of said plurality of video decoders, each said transport generator receives video data from a corresponding buffer and forwards the video data to said one corresponding video decoder.

18. The switched telecommunication access system of claim 17, wherein said plurality of video decoders comprises a plurality of Moving Pictures Experts Group (MPEG) decoders, said transport generators comprise a plurality of MPEG transport generators, each MPEG transport generator of said plurality of MPEG transport generators is coupled to one corresponding buffer of said plurality of buffers and receives video data from said one corresponding buffer, each MPEG transport generator is coupled to one corresponding MPEG decoder of said plurality of MPEG decoders and sends video data to said one corresponding MPEG decoder.

19. The switched telecommunication access system of claim 18, wherein one stream of video data representing a video program on a particular channel is sent from said switched multicasting station to one gateway device of said plurality of gateway devices even when the video program on the particular channel is requested for display on more than one display device coupled to said one gateway device.

20. The switched telecommunication access system of claim 19, wherein said switched multicasting station transmits video data to said gateway devices in Asynchronous Transfer Mode (ATM), further wherein only one Virtual Path Identifier (VPI) and one Virtual Channel Identifier (VCI) is used to identify video data on a particular channel sent from said switched multicasting station to one gateway device of said plurality of gateway devices even when the video data on the particular channel is requested for display on more than one display device coupled to said one gateway device.

21. A gateway device comprising:
   a controller for sending a video data request signal and routing video data received in response to the video data request signal; and
   a plurality of video decoders coupled to said controller for decoding the video data received in response to the video data request signal;
   wherein one stream of video data representing a video program on a particular channel is sent to the gateway device even when the video program on the particular channel is requested for display on more than one display device coupled to the gateway device, further wherein the one stream of video data representing the video program on the particular channel is used to display the video program on the more than one display device coupled to said one gateway device requesting the video program, the more than one display device requesting the video program, further wherein for the particular channel, the one stream of video data includes one copy, rather than multiple copies, of the video program on the particular channel.

22. The gateway device of claim 21, wherein the gateway device receives video data in Asynchronous Transfer Mode (ATM), further wherein only one Virtual Path Identifier (VPI) and one Virtual Channel Identifier (VCI) is used to identify video data on the particular channel sent to the gateway device even when the video data on the particular channel is requested for display on more than one display device coupled to the gateway device.

23. The gateway device of claim 22, wherein said controller comprises a gateway application specific integrated circuit (gateway ASIC), said gateway ASIC comprising a plurality of buffers.

24. The gateway device of claim 23, wherein said controller further comprises a processor coupled to said gateway ASIC.

25. The gateway device of claim 24, wherein said gateway ASIC further comprises a plurality of selectors, each selector of said plurality of selectors is coupled to each buffer of said plurality of buffers, each selector of said plurality of selectors is coupled to one corresponding video decoder of said plurality of video decoders and in response to a control signal from said processor selects data received from one of said plurality of buffers for transmission to said one corresponding video decoder.

26. The gateway device of claim 25, wherein said plurality of video decoders comprises a plurality of Moving Pictures Experts Group (MPEG) decoders.

27. The gateway device of claim 26, wherein said plurality of selectors comprises a plurality of multiplexers, said gateway ASIC further comprises a plurality of MPEG transport generators, each MPEG transport generator of said plurality of MPEG transport generators is coupled to one corresponding buffer of said plurality of buffers and receives data from said one corresponding buffer, each MPEG transport generator is coupled to each multiplexer of said plurality of multiplexers, each multiplexer of said plurality of multiplexers in response to a control signal from said processor selects data received from one MPEG transport generator of said plurality of MPEG transport generators for transmission to one corresponding MPEG decoder of said plurality of MPEG decoders.

28. A gateway device comprising:
   a plurality of video decoders for decoding video data; and
   a controller for sending a video data request signal and for routing video data received in response to the video data request signal, said controller comprising:
      a plurality of video a plurality of selectors, each selector of said plurality of selectors receives a plurality of video data streams and in response to a control signal from said controller selects one video data stream of the plurality of video data streams for transmission to one of said plurality of video decoders, wherein each of said plurality of selectors is coupled to one corresponding video decoder of said plurality of video decoders; and a plurality of buffers, each selector of said plurality of selectors is coupled to each buffer of said plurality of buffers for receiving the plurality of video data streams from said plurality of buffers, wherein each incoming video data stream is assigned to a first available buffer of said plurality of buffers such that video data in the incoming video data stream is stored in the first available buffer.

29. The gateway device of claim 28, wherein said controller comprises a gateway application specific integrated circuit (gateway ASIC), said gateway ASIC comprising said plurality of selectors and said plurality of buffers.

30. The gateway device of claim 29, wherein said controller further comprises a processor coupled to said gateway ASIC, each selector of said plurality of selectors is coupled to one corresponding video decoder of said plurality of video decoders and in response to a control signal from said processor selects a video data stream received from one of said plurality of buffers for transmission to said one corresponding video decoder.

31. The gateway device of claim 30, wherein said plurality of video decoders comprises a plurality of Moving Pictures Experts Group (MPEG) decoders.

32. The gateway device of claim 31, wherein said plurality of selectors comprises a plurality of multiplexers, said gateway ASIC further comprises a plurality of MPEG transport generators, each MPEG transport generator of said plurality of MPEG transport generators is coupled to one corresponding buffer of said plurality of buffers and receives a video data stream from said one corresponding buffer, each MPEG transport generator is coupled to each multiplexer of said plurality of multiplexers, each multiplexer of said plurality of multiplexers in response to a control signal from said processor selects a video data stream received from one MPEG transport generator of said plurality of MPEG transport generators for transmission to one corresponding MPEG decoder of said plurality of MPEG decoders.

33. The gateway device of claim 32, wherein one stream of video data representing a video program on a particular channel is sent to the gateway device even when the video program on the particular channel is requested for display on more than one display device coupled to the gateway device.

34. The gateway device of claim 33, wherein video data is transmitted to the gateway device in Asynchronous Transfer Mode (ATM), further wherein only one Virtual Path Identifier (VPI) and one Virtual Channel Identifier (VCI) is used to identify video data on a particular channel sent to the gateway device even when the video data on the particular channel is requested for display on more than one display device coupled to the gateway device.

35. A gateway device comprising:
a plurality of video decoders for decoding video data; and
a controller for sending a video data request signal and for routing video data received in response to the video data request signal, said controller comprising:
a plurality of buffers; and
a plurality of transport generators, wherein each buffer of said plurality of buffers is coupled to one corresponding transport generator of said plurality of transport generators, and each said buffer receives video data representing a video program requested for display on a display device corresponding to said one corresponding transport generator, stores the video data, and sends the video data to said one corresponding transport generator, further wherein each transport generator of said plurality of transport generators is coupled to one corresponding video decoder of said plurality of video decoders, each said transport generator receives video data from a corresponding buffer and forwards the video data to said one corresponding video decoder.

36. The gateway device of claim 35, wherein said plurality of video decoders comprises a plurality of Moving Pictures Experts Group (MPEG) decoders, said transport generators comprise a plurality of MPEG transport generators, each MPEG transport generator of said plurality of MPEG transport generators is coupled to one corresponding buffer of said plurality of buffers and receives video data from said one corresponding buffer, each MPEG transport generator is coupled to one corresponding MPEG decoder of said plurality of MPEG decoders and sends video data to said one corresponding MPEG decoder.

37. The gateway device of claim 36, wherein one stream of video data representing a video program on a particular channel is sent to the gateway device even when the video program on the particular channel is requested for display on more than one display device coupled to the gateway device.

38. The gateway device of claim 37, wherein video data is transmitted to the gateway device in Asynchronous Transfer Mode (ATM), further wherein only one Virtual Path Identifier (VPI) and one Virtual Channel Identifier (VCI) is used to identify video data on a particular channel sent to the gateway device even when the video data on the particular channel is requested for display on more than one display device coupled to the gateway device.

39. A switched telecommunication access system comprising:
means for transmitting video data in response to receiving a video data request signal; and
a plurality of means for receiving video data coupled to said means for transmitting, wherein said plurality of means for receiving send video data request signals to said means for transmitting and receive video data from said means for transmitting, at least one means for receiving of said plurality of means for receiving comprising:
means for controlling operation of said at least one means for receiving, wherein said means for controlling sends a video data request signal to said means for transmitting and routes video data received from said means for transmitting in response to the video data request signal; and
a plurality of means for decoding video data received from said means for transmitting, said plurality of means for decoding coupled to said means for controlling;
wherein one stream of video data representing a video program on a particular channel is sent from said means for transmitting to one means for receiving of said plurality of means for receiving even when the video program on the particular channel is requested for display on more than one display device coupled to said one means for receiving, further wherein the one stream of video data representing the video program on the particular channel is used to display the video program on the more than one display device coupled to said one means for receiving requesting the video program, the more than one display device requesting the video program, further wherein for the particular channel, the one stream of video data includes one copy, rather than multiple copies, of the video program on the particular channel.

40. The switched telecommunication access system of claim 39, wherein said means for transmitting transmits video data to said plurality of means for receiving in Asynchronous Transfer Mode (ATM), further wherein only one Virtual Path Identifier (VPI) and one Virtual Channel Identifier (VCI) is used to identify video data on the particular channel sent from said means for transmitting to said one means for receiving even when the video data on the particular channel is requested for display on more than one display device coupled to said one means for receiving.

41. The switched telecommunications access system of claim 40, wherein said means for controlling comprises a plurality of means for storing video data.

42. The switched telecommunication access system of claim 41, wherein said means for controlling further comprises means for processing video data coupled to said means for storing.

43. The switched telecommunications access system of claim 42, wherein said means for controlling further comprises a plurality of means for selecting video data from a plurality of video data inputs, each means for selecting of said plurality of means for selecting is coupled to each means for storing of said plurality of means for storing, each means for selecting of said plurality of means for selecting in response to a control signal from said means for processing selects video data received from one of said plurality of means for storing for transmission to one means for decoding of said plurality of means for decoding.

44. A switched telecommunication access system comprising:
    means for transmitting video data in response to receiving a video data request signal; and
    a plurality of means for receiving video data coupled to said means for transmitting, wherein said plurality of means for receiving send video data request signals to said means for transmitting and receive video data from said means for transmitting, at least one means for receiving of said plurality of means for receiving comprising:
        a plurality of means for decoding video data for decoding video data received from said means for transmitting; and
        means for controlling operation of said at least one means for receiving, said means for controlling coupled to said plurality of means for decoding video data, wherein said means for controlling sends a video data request signal to said means for transmitting and routes video data received from said means for transmitting in response to the video data request signal, said means for controlling comprising:
            a plurality of means for selecting, wherein each means for selecting of said plurality of means for selecting receives a plurality of video data streams and in response to a control signal from said means for controlling selects one video data stream of the plurality of video data streams for transmission to one means for decoding of said plurality of means for decoding, wherein each of said plurality of means for selecting is coupled to one corresponding means for decoding of said plurality of means for decoding;
            a plurality of means for storing video data; and
            means for processing video data coupled to said plurality of means for storing;
            wherein each means for selecting of said plurality of means for selecting is coupled to each means for storing of said plurality of means for storing, each means for selecting of said plurality of means for selecting in response to a control signal from said means for processing selects video data received from one of said plurality of means for storing for transmission to one of said plurality of means for decoding, wherein each incoming video data stream is assigned to a first available means for storing of said plurality of means for storing such that video data in the incoming video data stream is stored in the first available means for storing.

45. The switched telecommunications access system of claim 44, wherein one stream of video data representing a video program on a particular channel is sent from said means for transmitting to one means for receiving of said plurality of means for receiving even when the video program on the particular channel is requested for display on more than one display device coupled to said one means for receiving.

46. The switched telecommunication access system of claim 45, wherein said means for transmitting transmits video data to said plurality of means for receiving in Asynchronous Transfer Mode (ATM), further wherein only one Virtual Path Identifier (VPI) and one Virtual Channel Identifier (VCI) is used to identify video data on the particular channel sent from said means for transmitting to said one means for receiving even when the video data on the particular channel is requested for display on more than one display device coupled to said one means for receiving.

47. A switched telecommunication access system comprising:
    means for transmitting video data in response to receiving a video data request signal; and
    a plurality of means for receiving video data coupled to said means for transmitting, wherein said plurality of means for receiving send video data request signals to said means for transmitting and receive video data from said means for transmitting, at least one means for receiving of said plurality of means for receiving comprising:
        a plurality of means for decoding video data for decoding video data received from said means for transmitting; and
        means for controlling operation of said at least one means for receiving, said means for controlling coupled to said plurality of means for decoding video data, wherein said means for controlling sends a video data request signal to said means for transmitting and routes video data received from said means for transmitting in response to the video data request signal, said means for controlling comprising:
            a plurality of means for storing video data; and
            a plurality of transport generators, wherein each means for storing of said plurality of means for storing is coupled to one corresponding transport generator of said plurality of transport generators, and each said means for storing receives video data representing a video program requested for display on a display device corresponding to said one corresponding transport generator, stores the video data, and sends the video data to said one corresponding transport generator, further wherein each transport generator of said plurality of transport generators is coupled to one corresponding means for decoding of said plurality of means for decoding, each said transport generator receives video data from a corresponding means for storing and forwards the vide data to said one corresponding means for decoding.

48. The switched telecommunications access system of claim 47, wherein one stream of video data representing a video program on a particular channel is sent from said means for transmitting to one means for receiving of said plurality of means for receiving even when the video program on the particular channel is requested for display on more than one display device coupled to said one means for receiving.

49. The switched telecommunication access system of claim 48, wherein said means for transmitting transmits video data to said plurality of means for receiving in Asynchronous Transfer Mode (ATM), further wherein only one Virtual Path Identifier (VPI) and one Virtual Channel Identifier (VCI) is used to identify video data on the particular channel sent from said means for transmitting to said one means for receiving even when the video data on the particular channel is requested for display on more than one display device coupled to said one means for receiving.

50. A gateway device comprising:
   means for controlling operation of said gateway device, wherein said means for controlling sends a video data request signal and routes video data received in response to the video data request signal; and
   a plurality of means for decoding video data coupled to said means for controlling, wherein said means for decoding decodes the video data received in response to the video data request signal;
   wherein one stream of video data representing a video program on a particular channel is sent to the gateway device even when the video program on the particular channel is requested for display on more than one display device coupled to the gateway device, further wherein the one stream of video data representing the video program on the particular channel is used to display the video program on the more than one display device coupled to said one gateway device requesting the video program, the more than one display device requesting the video program, further wherein for the particular channel, the one stream of video data includes one copy, rather than multiple copies, of the video program on the particular channel.

51. The gateway device of claim 50, wherein the gateway device receives video data in Asynchronous Transfer Mode (ATM), further wherein only one Virtual Path Identifier (VPI) and one Virtual Channel Identifier (VCI) is used to identify video data on the particular channel sent to the gateway device even when the video data on the particular channel is requested for display on more than one display device coupled to the gateway device.

52. The gateway device of claim 51, wherein said means for controlling comprises a plurality of means for storing video data.

53. The gateway device of claim 52, wherein said means for controlling further comprises means for processing video data coupled to said means for storing.

54. The gateway device of claim 53, wherein said means for controlling further comprises a plurality of means for selecting video data from a plurality of video data inputs, each means for selecting of said plurality of means for selecting is coupled to each means for storing of said plurality of means for storing, each means for selecting of said plurality of means for selecting in response to a control signal from said means for processing selects video data received from one of said plurality of means for storing for transmission to one of said plurality of means for decoding.

55. A gateway device comprising:
   a plurality of means for decoding video data; and
   means for controlling operation of the gateway device, said means for controlling coupled to said plurality of means for decoding video data, wherein said means for controlling sends a video data request signal and routes video data received in response to the video data request signal, said means for controlling comprising:
   a plurality of means for selecting, wherein each means for selecting of said plurality of means for selecting receives a plurality of video data streams and in response to a control signal from said means for controlling selects one video data stream of the plurality of video data streams for transmission to one means for decoding of said plurality of means for decoding, wherein each of said plurality of means for selecting is coupled to one corresponding means for decoding of said plurality of means for decoding;
   a plurality of means for storing video data; and
   means for processing video data coupled to said means for storing;
   wherein each means for selecting of said plurality of means for selecting is coupled to each means for storing of said plurality of means for storing, each means for selecting of said plurality of means for selecting in response to a control signal from said means for processing selects video data received from one of said plurality of means for storing for transmission to one of said plurality of means for decoding, wherein each incoming video data stream is assigned to a first available means for storing of said plurality of means for storing such that video data in the incoming video data stream is stored in the first available means for storing.

56. The gateway device of claim 55, wherein one stream of video data representing a video program on a particular channel is sent to the gateway device even when the video program on the particular channel is requested for display on more than one display device coupled to said one means for receiving.

57. The gateway device of claim 56, wherein the gateway device receives video data in Asynchronous Transfer Mode (ATM), further wherein only one Virtual Path Identifier (VPI) and one Virtual Channel Identifier (VCI) is used to identify video data on the particular channel sent to the gateway device even when the video data on the particular channel is requested for display on more than one display device coupled to the gateway device.

58. A gateway device comprising:
   a plurality of means for decoding video data; and
   means for controlling operation of the gateway device, said means for controlling coupled to said plurality of means for decoding video data, wherein said means for controlling sends a video data request signal and routes video data received in response to the video data request signal, said means for controlling comprising:
   a plurality of means for storing video data; and
   a plurality of transport generators, wherein each means for storing of said plurality of means for storing is coupled to one corresponding transport generator of said plurality of transport generators, and each said means for storing receives video data representing a video program requested for display on a display device corresponding to said one corresponding transport generator, stores the video data, and sends the video data to said one corresponding transport generator, further wherein each transport generator of said plurality of transport generators is coupled to one corresponding means for decoding of said plurality of means for decoding, each said transport generator receives video data from a corresponding means for storing and forwards the video data to said one corresponding means for decoding.

59. The gateway device of claim 58, wherein one stream of video data representing a video program on a particular channel is sent to the gateway device even when the video program on the particular channel is requested for display on more than one display device coupled to the gateway device.

60. The gateway device of claim 59, wherein the gateway device receives video data in Asynchronous Transfer Mode (ATM), further wherein only one Virtual Path Identifier (VPI) and one Virtual Channel Identifier (VCI) is used to identify video data on the particular channel sent to the gateway device even when the video data on the particular channel is requested for display on more than one display device coupled to the gateway device.

61. A method of operating a switched video telecommunication access system having a switched multicasting station and a plurality of gateway devices, where a gateway device may be coupled to a plurality of display devices, said method comprising:
   receiving a first request for video data from a gateway device, wherein the video data is video data on a first channel, and further wherein the first request is for displaying a video program represented by the video data on the first channel on a first display device coupled to the gateway device;
   receiving a second request for the video data from the gateway device, wherein the second request is for displaying the video program represented by the video data on the first channel on a second display device coupled to the gateway device; and
   sending one stream of video data representing the video data on the first channel from the switched multicasting station to the gateway device for displaying the video program represented by the video data on the first and second display devices, wherein the one stream of video data is used to display the video program on the first and second display devices, wherein the one stream of video data includes one copy, rather than multiple copies, of the video data on the first channel.

62. The method of claim 61, wherein the video data on the first channel is sent to the gateway device in Asynchronous Transfer Mode (ATM) and is identified by only one Virtual Path Identifier (VPI) and one Virtual Channel Identifier (VCI).

63. The method of claim 62, further comprising:
   storing the video data in a first video buffer available for storing the video data;
   reformatting the video data into video data serial packets;
   sending the video data serial packets to a plurality of selectors;
   selecting the video data serial packets for transmission to a first video decoder coupled to the first display device;
   selecting the video data serial packets for transmission to a second video decoder coupled to the second display device;
   decoding the video data serial packets at the first video decoder to generate decoded video data;
   decoding the video data serial packets at the second video decoder to generate decoded video data;
   sending the decoded video data from the first video decoder to the first display device; and
   sending the decoded video data from the second video decoder to the second display device.

64. The method of claim 61, further comprising:
   storing the video data in a first buffer;
   storing the video data in a second buffer;
   first reformatting the video data from the first buffer into first video data serial packets;
   second reformatting the video data from the second buffer into second video data serial packets;
   sending the first video data serial packets to a first video decoder coupled to the first display device;
   sending the second video data serial packets to a second video decoder coupled to the second display device;
   decoding the first video data serial packets at the first video decoder to generate first decoded video data;
   decoding the second video data serial packets at the second video decoder to generate second decoded video data;
   sending the first decoded video data from the first video decoder to the first display device; and
   sending the second decoded video data from the second video decoder to the second display device.

65. A method of operating a switched video telecommunication access system having a switched multicasting station and a plurality of gateway devices, where a gateway device may be coupled to a plurality of display devices, said method comprising:
   receiving a first request for video data from a gateway device, wherein the video data is video data on a first channel;
   receiving a second request for the video data from the gateway device;
   sending the video data on the first channel from the switched multicasting station to the gateway device in response to at least one of the first request and the second request;
   storing the video data in a first video buffer available for storing the video data;
   reformatting the video data into video data serial packets;
   sending the video data serial packets to a plurality of selectors;
   selecting at a first selector of the plurality of selectors the video data serial packets for transmission to a first video decoder coupled to a first display device; and
   selecting at a second selector of the plurality of selectors the video data serial packets for transmission to a second video decoder coupled to a second display device.

66. The method of claim 65, further comprising:
   decoding the video data serial packets at the first video decoder to generate decoded video data;
   decoding the video data serial packets at the second video decoder to generate decoded video data;
   sending the decoded video data from the first video decoder to the first display device; and
   sending the decoded video data from the second video decoder to the second display device.

67. The method of claim 66, wherein said sending the video data on the first channel from the switched multicasting station to the gateway device comprises sending one stream of video data representing the video data on the first channel from the switched multicasting station to the gateway device.

68. The method of claim 67, wherein the video data on the first channel is sent to the gateway device in Asynchronous Transfer Mode (ATM) and is identified by only one Virtual Path Identifier (VPI) and one Virtual Channel Identifier (VCI).

69. A method of multicasting video data to a plurality of display devices coupled to a gateway device, said method comprising:

sending a first request for video data, wherein the first request is for displaying a video program represented by the video data on a first channel on a first display device coupled to the gateway device;

sending a second request for the video data, wherein the second request is for displaying the video program represented by the video data on the first channel on a second display device coupled to the gateway device; and receiving one stream of video data representing the video data on the first channel for displaying the video program represented by the video data on the first and second display devices, wherein the one stream of video data is used to display the video program on the first and second display devices, further wherein the one stream of video data includes one copy, rather than multiple copies, of the video data on the first channel.

70. The method of claim 69, wherein the video data on the first channel is received by the gateway device in Asynchronous Transfer Mode (ATM) and is identified by only one Virtual Path Identifier (VPI) and one Virtual Channel Identifier (VCI).

71. The method of claim 70, further comprising:

storing the video data in a first video buffer available for storing the video data;

reformatting the video data into video data serial packets;

sending the video data serial packets to a plurality of selectors;

selecting the video data serial packets for transmission to a first video decoder coupled to the first display device;

selecting the video data serial packets for transmission to a second video decoder coupled to the second display device;

decoding the video data serial packets at the first video decoder to generate decoded video data;

decoding the video data serial packets at the second video decoder to generate decoded video data;

sending the decoded video data from the first video decoder to the first display device; and sending the decoded video data from the second video decoder to the second display device.

72. The method of claim 69, further comprising:

storing the video data in a first buffer;

storing the video data in a second buffer;

first reformatting the video data from the first buffer into first video data serial packets;

second reformatting the video data from the second buffer into second video data serial packets;

sending the first video data serial packets to a first video decoder coupled to the first display device;

sending the second video data serial packets to a second video decoder coupled to the second display device;

decoding the first video data serial packets at the first video decoder to generate first decoded video data;

decoding the second video data serial packets at the second video decoder to generate second decoded video data;

sending the first decoded video data from the first video decoder to the first display device; and sending the second decoded video data from the second video decoder to the second display device.

73. A method of multicasting video data to a plurality of display devices coupled to a gateway device, said method comprising:

sending a first request for video data, wherein the video data is video data on a first channel;

sending a second request for the video data;

receiving the video data on the first channel in response to at least one of the first request and the second request;

storing the video data in a first video buffer available for storing the video data;

reformatting the video data into video data serial packets;

sending the video data serial packets to a plurality of selectors;

selecting at a first selector of the plurality of selectors the video data serial packets for transmission to a first video decoder coupled to a first display device; and selecting at a second selector of the plurality of selectors the video data serial packets for transmission to a second video decoder coupled to a second display device.

74. The method of claim 73, further comprising:

decoding the video data serial packets at the first video decoder to generate decoded video data;

decoding the video data serial packets at the second video decoder to generate decoded video data;

sending the decoded video data from the first video decoder to the first display device; and sending the decoded video data from the second video decoder to the second display device.

75. The method of claim 74, wherein said receiving comprises receiving one stream of video data representing the video data on the first channel.

76. The method of claim 75, wherein the video data on the first channel is received by the gateway device in Asynchronous Transfer Mode (ATM) and is identified by only one Virtual Path Identifier (VPI) and one Virtual Channel Identifier (VCI).

77. The switched telecommunication access system of claim 47, wherein said plurality of means for decoding video data comprises a plurality of Moving Pictures Experts Group (MPEG) decoders, said means for controlling further comprises a plurality of MPEG transport generators, each MPEG transport generator of said plurality of MPEG transport generators is coupled to one corresponding means for storing video data of said plurality of means for storing video data and receives video data from said one corresponding means for storing video data, each MPEG transport generator is coupled to one corresponding MPEG decoder of said plurality of MPEG decoders and sends video data to said one corresponding MPEG decoder.

78. The gateway device of claim 58, wherein said plurality of means for decoding video data comprises a plurality of Moving Pictures Experts Group (MPEG) decoders, said means for controlling further comprises a plurality of MPEG transport generators, each MPEG transport generator of said plurality of MPEG transport generators is coupled to one corresponding means for storing video data of said plurality of means for storing video data and receives video data from said one corresponding means for storing video data, each MPEG transport generator is coupled to one corresponding MPEG decoder of said plurality of MPEG decoders and sends video data to said one corresponding MPEG decoder.

79. A switched telecommunication access system comprising:
   a switched multicasting station, wherein said switched multicasting station transmits video data in response to receiving a video data request signal; and
   a plurality of gateway devices coupled to the switched multicasting station, wherein said gateway devices send video data request signals to said switched multicasting station and receive video data from said switched multicasting station, at least one gateway device of said plurality of gateway devices comprising:
      a plurality of Moving Pictures Experts Group (MPEG) decoders; and
      a controller coupled to said plurality of MPEG decoders, said controller comprising:
         a processor; and
         a gateway application specific integrated circuit (gateway ASIC) coupled to said processor, said gateway ASIC comprising:
            a plurality of buffers;
            a plurality of MPEG transport generators, each MPEG transport generator of said plurality of MPEG transport generators is coupled to one corresponding buffer of said plurality of buffers and receives data from said one corresponding buffer; and
            a plurality of multiplexers, each multiplexer of said plurality of multiplexers is coupled to each MPEG transport generator of said plurality of MPEG transport generators, each multiplexer of said plurality of multiplexers is coupled to one corresponding MPEG decoder of said plurality of MPEG decoders and in response to a control signal from said processor selects data received from one MPEG transport generator of said plurality of MPEG transport generators for transmission to said one corresponding MPEG decoder;
   wherein one stream of video data representing a video program on a particular channel is sent from said switched multicasting station to one gateway device of said plurality of gateway devices even when the video program on the particular channel is requested for display on more than one display device coupled to said one gateway device.

80. The switched telecommunication access system of claim 79, wherein said switched multicasting station transmits video data to said gateway devices in Asynchronous Transfer Mode (ATM), further wherein only one Virtual Path Identifier (VPI) and one Virtual Channel Identifier (VCI) is used to identify video data on a particular channel sent from said switched multicasting station to one gateway device of said plurality of gateway devices even when the video data on the particular channel is requested for display on more than one display device coupled to said one gateway device.

81. The switched telecommunication access system of claim 79, wherein said switched multicasting station comprises a broadband digital terminal.

82. The switched telecommunication access system of claim 81 further comprising a plurality of optical network units coupled to said broadband digital terminal and said plurality of gateway devices.

83. A switched telecommunication access system comprising:
   a switched multicasting station, wherein said switched multicasting station transmits video data in response to receiving a video data request signal; and
   a plurality of gateway devices coupled to the switched multicasting station, wherein said gateway devices send video data request signals to said switched multicasting station and receive video data from said switched multicasting station, at least one gateway device of said plurality of gateway devices comprising:
      a plurality of Moving Pictures Experts Group (MPEG) decoders; and
      a controller coupled to said plurality of MPEG decoders, said controller comprising:
         a processor; and
         a gateway application specific integrated circuit (gateway ASIC) coupled to said processor, said gateway ASIC comprising:
            a plurality of buffers;
            a plurality of MPEG transport generators, each MPEG transport generator of said plurality of MPEG transport generators is coupled to one corresponding buffer of said plurality of buffers and receives a video data stream from said one corresponding buffer; and
            a plurality of multiplexers, each multiplexer of said plurality of multiplexers is coupled to each MPEG transport generator of said plurality of MPEG transport generators and receives a plurality of video data streams from said plurality of MPEG transport generators, each multiplexer of said plurality of multiplexers is coupled to one corresponding MPEG decoder of said plurality of MPEG decoders and in response to a control signal from said processor selects one video data stream of the plurality of video data streams for transmission to said one corresponding MPEG decoder.

84. The switched telecommunication access system of claim 83, wherein one stream of video data representing a video program on a particular channel is sent from said switched multicasting station to one gateway device of said plurality of gateway devices even when the video program on the particular channel is requested for display on more than one display device coupled to said one gateway device.

85. The switched telecommunication access system of claim 84, wherein said switched multicasting station transmits video data to said gateway devices in Asynchronous Transfer Mode (ATM), further wherein only one Virtual Path Identifier (VPI) and one Virtual Channel Identifier (VCI) is used to identify video data on a particular channel sent from said switched multicasting station to one gateway device of said plurality of gateway devices even when the video data on the particular channel is requested for display on more than one display device coupled to said one gateway device.

86. A gateway device comprising:
   a plurality of Moving Pictures Experts Group (MPEG) decoders; and
   a controller coupled to said plurality of MPEG decoders, wherein said controller sends a video data request signal and routes video data received in response to the video data request signal, said controller comprising:
      a processor; and
      a gateway application specific integrated circuit (gateway ASIC) coupled to said processor, said gateway ASIC comprising:
         a plurality of buffers;
         a plurality of MPEG transport generators, each MPEG transport generator of said plurality of MPEG transport generators is coupled to one corresponding buffer of said plurality of buffers and receives data from said one corresponding buffer; and a plurality of multiplexers, each multiplexer of said plurality of multiplexers is coupled to each MPEG transport generator of said plurality of MPEG transport generators, each multiplexer of said plurality of multiplexers is coupled to one corresponding MPEG decoder of said plurality of MPEG decoders and in response to a control signal from said processor selects data received from one of said plurality of MPEG transport generators for transmission to said one corresponding MPEG decoder;

wherein one stream of video data representing a video program on a particular channel is sent to the gateway device even when the video program on the particular channel is requested for display on more than one display device coupled to the gateway device.

87. The gateway device of claim 85, wherein the gateway device receives video data in Asynchronous Transfer Mode (ATM), further wherein only one Virtual Path Identifier (VPI) and one Virtual Channel Identifier (VCI) is used to identify video data on the particular channel sent to the gateway device even when the video data on the particular channel is requested for display on more than one display device coupled to the gateway device.

88. A gateway device comprising:
a plurality of Moving Pictures Experts Group (MPEG) decoders; and
a controller coupled to said plurality of MPEG decoders, wherein said controller sends a video data request signal and routes video data received in response to the video data request signal, said controller comprising:
a processor; and
a gateway application specific integrated circuit (gateway ASIC) coupled to said processor, said gateway ASIC comprising:
a plurality of buffers;
a plurality of MPEG transport generators, each MPEG transport generator of said plurality of MPEG transport generators is coupled to one corresponding buffer of said plurality of buffers and receives a video data stream from said one corresponding buffer; and
a plurality of multiplexers, each multiplexer of said plurality of multiplexers is coupled to each MPEG transport generator of said plurality of MPEG transport generators and receives a plurality of video data streams from said plurality of buffers, each multiplexer of said plurality of multiplexers is coupled to one corresponding MPEG decoder of said plurality of MPEG decoders and in response to a control signal from said processor selects one video data stream from the plurality of video data streams for transmission to said one corresponding MPEG decoder.

89. The gateway device of claim 88, wherein one stream of video data representing a video program on a particular channel is sent to the gateway device even when the video program on the particular channel is requested for display on more than one display device coupled to the gateway device.

90. The gateway device of claim 89, wherein video data is transmitted to the gateway device in Asynchronous Transfer Mode (ATM), further wherein only one Virtual Path Identifier (VPI) and one Virtual Channel Identifier (VCI) is used to identify video data on a particular channel sent to the gateway device even when the video data on the particular channel is requested for display on more than one display device coupled to the gateway device.

* * * * *